United States Patent [19]

Hills

[11] Patent Number: 4,646,290

[45] Date of Patent: Feb. 24, 1987

[54] DATA TRANSMISSION METHOD AND APPARATUS

[75] Inventor: Michael T. Hills, Silver Spring, Md.

[73] Assignee: National Information Utilities Corp., McLean, Va.

[21] Appl. No.: 637,208

[22] Filed: Aug. 3, 1984

[51] Int. Cl.$^4$ ............................. H04J 3/22; H04J 3/00
[52] U.S. Cl. ...................................... 370/84; 370/109
[58] Field of Search .............. 370/84, 109; 178/22.04, 178/22.05; 375/38

[56] References Cited

U.S. PATENT DOCUMENTS

| | | | |
|---|---|---|---|
| 3,213,201 | 10/1965 | Flood et al. .......................... | 370/109 |
| 3,982,077 | 9/1976 | Clark et al. ............................ | 370/84 |
| 4,041,453 | 8/1977 | Umeda et al. .......................... | 375/38 |
| 4,417,349 | 11/1983 | Hills et al. .............................. | 381/4 |
| 4,520,232 | 5/1985 | Wilson ............................... | 178/22.05 |

*Primary Examiner*—Douglas W. Olms
*Assistant Examiner*—Wellington Chin
*Attorney, Agent, or Firm*—Kenyon & Kenyon

[57] ABSTRACT

A data transmission method and apparatus, particularly useful in an SCA FM subcarrier data transmission system, is disclosed. The method comprises selectively arranging individual characters of data messages of varying bit rates in real time in a multiframe matrix and transmitting the data messages at a defined bit rate to individual receiver locations where the data messages addressed to the individual receiver locations are decoded and displayed. The transmission method allows data messages of varying bit rates to be transmitted at a single defined bit rate to the receiver locations. At the receiver locations, the data messages are extracted from the matrix and regenerated. The data transmission method allows for downstream insertion of additional data and is highly tolerant of burst errors. A system for transmitting data using the method is also described.

66 Claims, 16 Drawing Figures

| ROWS | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|---|
| 0 | S | a0 | a0 | a0 | a0 | a0 | a1 | a1 | a1 | a1 | a2 | a2 | a2 | a2 | a2 | a2 | a2 | a2 | a2 | a2 | a3 | a3 | a3 | a3 | a4 | a4 | a4 | a4 | a4 | a4 | a4 |
| 1 | S | b0 | b0 | b0 | b0 | b0 | b1 | b1 | b1 | b1 | b2 | b2 | b2 | b2 | b2 | b2 | b2 | b2 | b2 | b2 | b3 | b3 | b3 | b3 | m | m | m | m | m | m | m |
| 2 | S | | | | | | d | d | d | d | | | | | | | | | | | | | | | m | m | m | m | m | m | m |
| 3 | S | | | | | | d | d | d | d | | | | | | | | | | | | | | | m | m | m | m | m | m | m |
| 4 | S | | | | | | d | d | d | d | | | | | | | | | | | | | | | m | m | m | m | m | m | m |
| 5 | S | | | | | | d | d | d | d | | | | | | | | | | | | | | | m | m | m | m | m | m | m |
| 6 | S | | | | | | d | d | d | d | | | | | | | | | | | | | | | m | m | m | m | m | m | m |
| 7 | S | | | | | | d | d | d | d | | | | | | | | | | | | | | | m | m | m | m | m | m | m |
| 8 | S | | | | | | d | d | d | d | | | | | | | | | | | | | | | m | m | m | m | m | m | m |
| 9 | S | | | | | | d | d | d | d | | | | | | | | | | | | | | | m | m | m | m | m | m | m |

COLUMNS

FIG. 2

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|
| S | R0 | a0 | a0 | a0 | a0 | a1 | a1 | a1 | a1 | a2 | a2 | a2 | a2 | a2 | a2 | a3 | a3 | a3 | a4 | a4 | a4 | a4 | a4 |
| S | R1 | b0 | b0 | b0 | b0 | b1 | b1 | b1 | b1 |   |   |   |   |   |   | b3 | b3 | b3 | m | m | m | m | m |
| S | R2 | y | y | y | y | n | n | n | n | x | x | x | x | x | x | x | x | x | m | m | m | m | m |
| S | R3 | y | y | y | y | n | n | n | n | x | x | x | x | x | x | x | x | x | m | m | m | m | m |
| S | R4 | y | y | y | y | n | n | n | n | x | x | x | x | x | x | x | x | x | m | m | m | m | m |
| S | R5 | y | y | y | y | n | n | n | n | x | x | x | x | x | x | x | x | x | m | m | m | m | m |
| S | R6 | y | y | y | y | n | n | n | n | x | x | x | x | x | x | x | x | x | m | m | m | m | m |
| S | R7 | y | y | y | y | n | n | n | n | x | x | x | x | x | x | x | x | x | m | m | m | m | m |
| S | R8 | y | y | y | y | n | n | n | n | x | x | x | x | x | x | x | x | x | m | m | m | m | m |
| S | R9 | y | y | y | y | n | n | n | n | x | x | x | x | x | x | x | x | x | m | m | m | m | m |

COLUMNS

FIG. 3

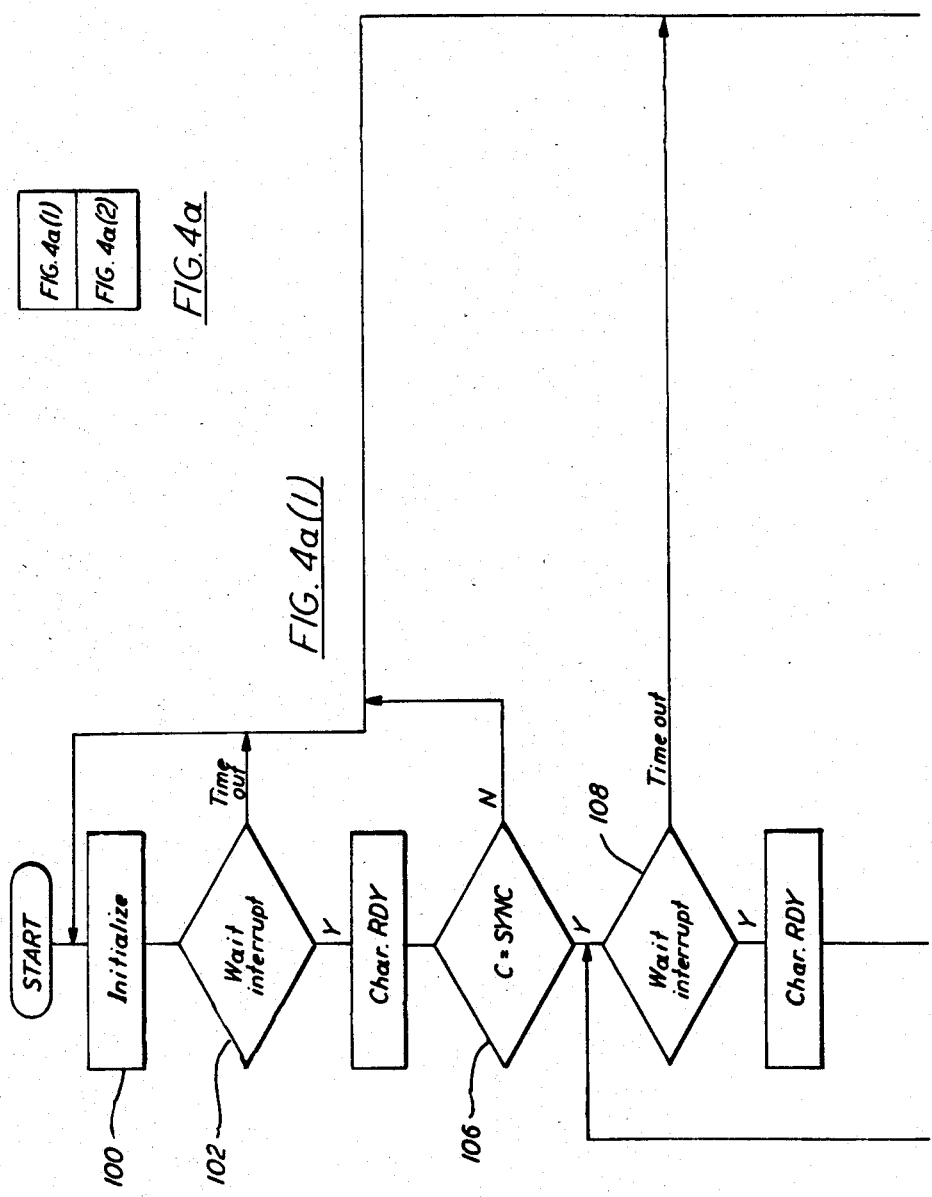

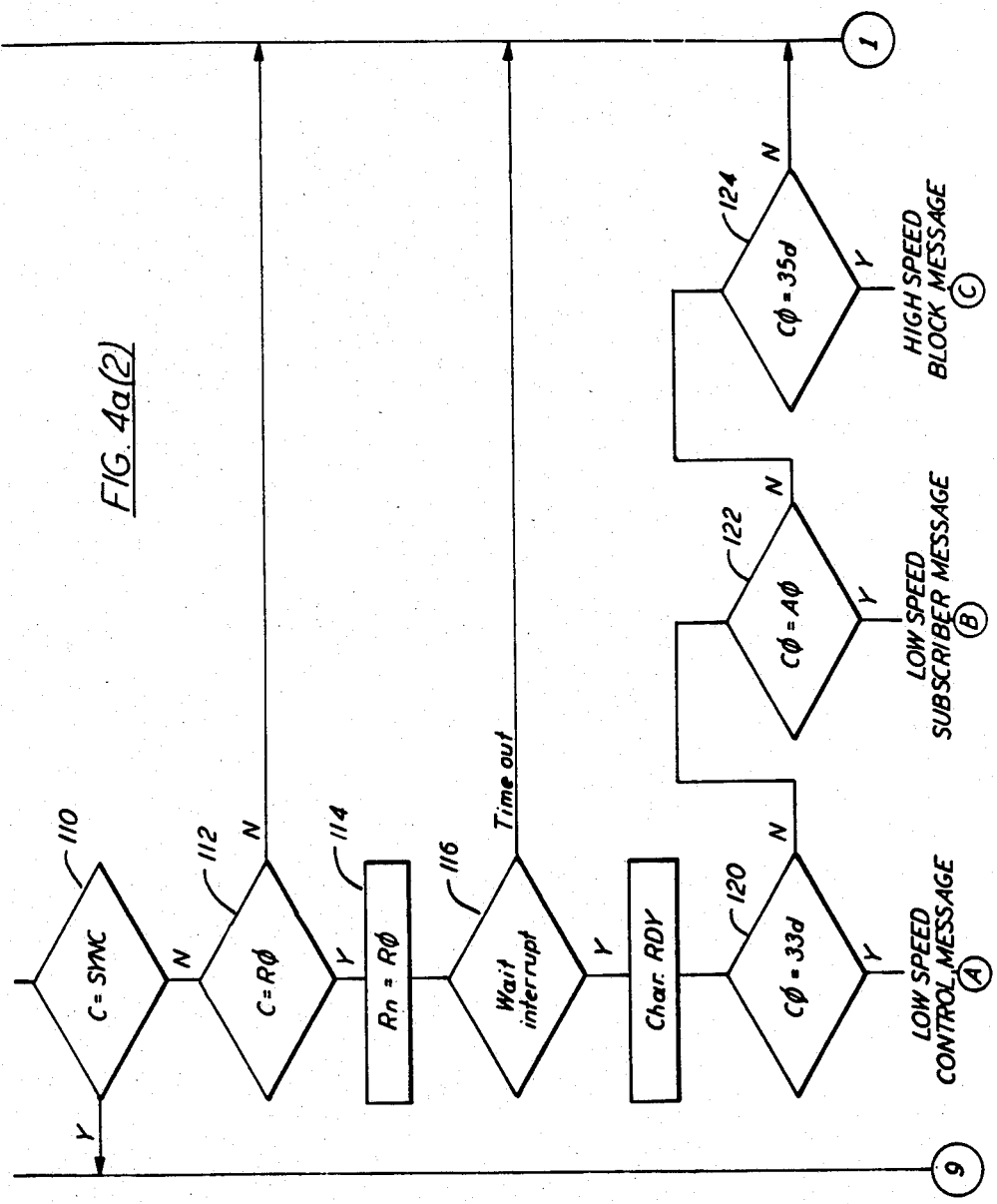
FIG. 4a(2)

DATA TRANSMISSION METHOD AND APPARATUS

BACKGROUND OF THE INVENTION

The present invention relates to data transmission systems and methods and more particularly, to a digital data transmission system and method which groups and organizes incoming data communications having different baud rates in real time and transmits the data at a defined baud rate for reception by a large number of subscribers. The present invention has particular application, for example, to systems for transmitting digital data via an FM broadcast station's subcarrier, or as it is known, by a Subsidiary Communications Authorization (SCA) subcarrier or other forms of one-way broadcast systems.

The need exists for a method and apparatus for transmitting digital data via an FM subcarrier which has the ability to transmit multiple communications at varying speeds, for example, at both low speed (below 300 bits/sec) and high speed (up to 4800 bits/sec). The present invention provides a means for fulfilling this need.

SUMMARY OF THE INVENTION

Accordingly, it is an object of the present invention to provide a method and apparatus for transmitting both low and high speed messages via a single communications link, such as an FM broadcast subcarrier communications link.

It is a further object of the present invention to provide such a method and apparatus which allows the nearly simultaneous transmission of communications which are normally transmitted at different bit rates, e.g., low speed, below 300 bits/sec. and high speed, up to 4800 bits/sec.

It is still a further object of the present invention to provide a data transmission method and apparatus which groups incoming data messages in real time and transmits the data with minimal throughput delay.

It is still a further object to provide a data transmission method and apparatus which is highly tolerant of burst errors.

It is yet a further object to provide a data transmission method and apparatus which provides for the insertion of data communications into a data transmission at a local level.

It is yet another object to provide a data transmission method and apparatus which operates both in synchronous and asynchronous modes.

These and other objects of the present invention are achieved by a method for transmitting data from a first location to at least one receiver location comprising the steps of receiving a plurality of data messages of varying bit rates at the first location, organizing the data messages into a multiframe matrix, the matrix including a plurality of columns, each column representing a period of time, and a plurality of rows, each row representing a frame of the matrix, individual characters of the data messages being selectively inserted into the columns of the matrix in real time, transmitting over a transmission medium, for each successive frame of the matrix, the characters in successive columns at a defined bit rate greater than the bit rates of any of the data messages and decoding at each receiver location the transmitted matrix, messages which are addressed to a receiver location being available for display at the receiver location.

The invention also includes within its scope a system for carrying out the method, as will be clear from the description which follows.

Other objects, features and advantages of the present invention will be apparent from a reading of the following description.

BRIEF DESCRIPTION OF THE DRAWINGS

The invention will be described in greater detail in the following detailed description with reference to the drawings, in which:

FIG. 2 shows the matrix framing structure for synchronous transmission of data communications according to the present invention;

FIG. 3 shows the matrix framing structure for asynchronous transmission of data communications according to the present invention; and FIGS. 4a-m, when viewed in combined form, are a flow chart illustrating the operation of a receiver which decodes the received data transmitted via the framing structure of FIG. 3.

DETAILED DESCRIPTION

Figure 1:
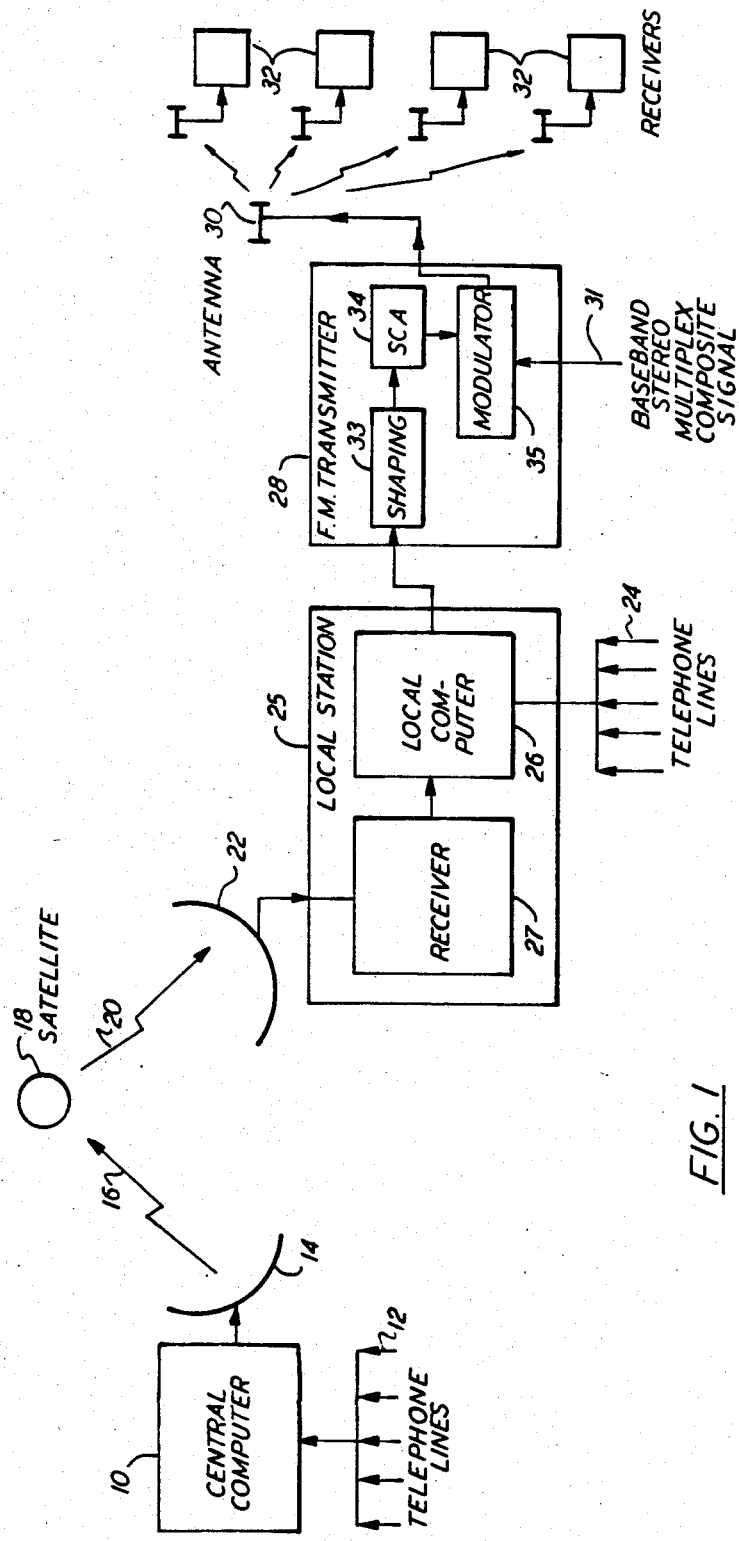
FIG. 1 is a block diagram of the basic system employing the present invention including satellite transmission from a central location to a local FM radio station prior to FM SCA subcarrier data transmission to individual receivers.

With reference now to the drawings, FIG. 1 illustrates one arrangment of the basic system. A central computer 10 directs messages from phone lines 12 and other messages generated by the computer, either automatically or manually, to a microwave transmitter and antenna 14. A satellite 18 in geosynchronous orbit receives the transmissions via up-link 16 and returns them to a local broadcast station's antenna 22 via down-link 20. The local station 25 includes a receiver 27 and local telephone messages can optionally be directed from local telephone lines 24 into the system if the local station is equipped with a local computer 26. A special transmission protocol, to be discussed below, is used by both the central and local computers in order to allocate messages to particular time slots. The received signals are then coupled to F.M. transmitter 28 which includes spectral shaping circuitry 33, subcarrier generator and modulator 34 and F.M. modulator 35. Transmission between local station 25 and F.M. transmitter 28 is typically via a land line of several miles. In transmitter 28, the received data is spectrally shaped by circuitry 33, modulates the SCA subcarrier in circuit 34 prior to insertion into the multiplexed composite signal 31 and then modulates the station's main carrier frequency prior to transmission. An antenna 30 radiates the modulated F.M. carrier to local users. Each user is equipped with a special receiver 32 for recovering the signal modulating the subcarrier including a microprocessor for determining when messages are addressed to itself and for processing and displaying the recovered data. The operation of one embodiment of such a receiver will be discussed in detail below.

Components of the F.M. transmitter 28 which can be used to practice the invention include the following: 33, the Digital Partial Response Filter described in copending application Ser. No. 483,738, filed Apr. 11, 1983, of Michael T. Hills and Raymond L. Heinrich; 34, the Digital Subcarrier Generator and Modulator described in copending application Ser. No. 483,737, filed Apr. 11, 1983, of Raymond L. Heinrich, Michael T. Hills and David W. Brown.

An important feature of the present invention is the ability to maintain the security of transmitted messages through system control of who may receive the messages. Those receivers 32 that do not include circuitry capable of decoding the transmitted data will be unaware of data messages transmitted on the subcarrier, although still able to receive normal F.M. programming. Those equipped with the required microprocessor circuits will need to respond to specific addresses in order to receive data, and the addresses may be changed at will at the central computer or at the local station.

The central, local and receiver computers process data messages in accordance with a framing structure or matrix to be discussed below. There are two sources of data messages at central computer 10: Those received from one or more telephone lines 12 and those generated by the central computer, either automatically or through manual entry. All data messages are merged into a single data stream which operates at a faster rate than any of the sources. This new data stream is inserted into the main transmission 16 destined towards the satellite 18.

At the local station 25, a local computer 26 is required only if a local data message capability is needed. If the capability is not needed, then the down-side transmission 20 is forwarded to FM transmitter 28 without changing the content.

Local computer 26 has three sources of data messages: Those received from one or more local telephone lines 24, those generated by the local computer either automatically or through manual entry and those received in the down-side transmission 20. The local computer will extract the composite data messages from the main transmission 20, verify accuracy, remove any messages addressed to itself and locate available portions so that local messages can be inserted to form a modified composite data message stream. This stream will be re-inserted into the main transmission destined for FM transmitter 28.

At the individual receivers 32, the composite data message will be extracted from the main transmission. A computer, for example, a microprocessor, will verify accuracy and process only those data messages it recognizes to be addressed to itself. Processing includes the ability to change internal group address codes internally at the receivers 32.

The present invention can be used to transmit data both synchronously and asynchronously. Both user generated messages and control directives may be transmitted. Such messages may originate centrally or at the national level, entering the network before transmission to the satellite 18, or may enter at the local level and join the stream received from the satellite. Also, the content of the data may be addressed individually or to a group of receiver terminals. Group addressing allows several receiver terminals to accept a single message. Further, the speed of the processed data messages may be low, that is, at or below 300 baud asynchronous or it may be a high speed transmission from 300 baud up to 4800 baud asynchronous.

The following five types of messages as shown in Table I may be transmitted using the method of the present invention:

TABLE I

| TYPE 0 | National Origination, Individually Addressed. |
|---|---|
| TYPE 1 | National Origination, Group Addressed. |
| TYPE 2 | Local Origination, Individually Addressed. |
| TYPE 3 | Local Origination, Group Addressed. |
| TYPE 4 | High Speed Message. |

In Table I, TYPE 0–3 messages are low speed messages, and can be either control or subscriber messages. TYPE 4 messages are high speed subscriber messages only.

Figure 2:
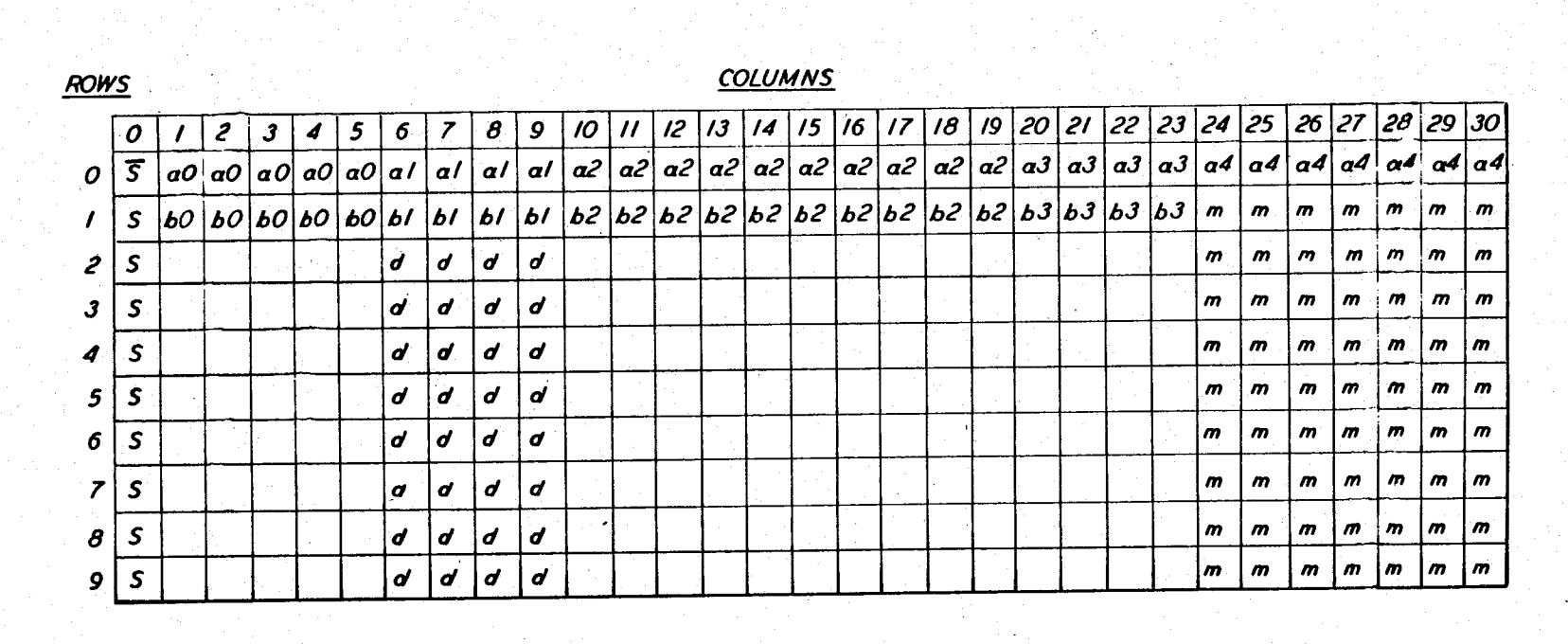

These messages are transmitted via a transmission protocol having a multiframe format comprising a number of frames organized into a matrix. The framing structure for synchronous transmission is shown in FIG. 2, while the structure for asynchronous transmission is shown in FIG. 3. The framing structure shown in FIGS. 2 and 3 will hereinafter often be referred to as a "multiframe." Each row of the multiframe is a frame. Each frame is divided into a number of cells, the cells forming columns. The first two frames (Rows 0 and 1) generally contains message classification and group addressing information.

The framing structure for synchronous data transmission will be discussed first. As shown in FIG. 2, the multiframe contains 10 frames of 31 cells, where each cell contains, for example, an 8 bit character. The data in the cells is transmitted serially, from left to right and top to bottom, and preferably at 9600 bits/sec. Each cell therefore represents a time slot. To illustrate the operation of multiframe transmission, a low speed 300 baud asynchronous message to be inserted into the multiframe is received by central computer 10 or local computer 26 at a rate of 30 characters per second, for example. The multiframes are transmitted at a rate of 9600 baud, or 1200 characters per second. As the incoming message is received, it is placed in a column of the matrix in real time, i.e., the characters of each message are immediately inserted into the multiframe when received, and then transmitted, in contrast to a delayed or "packet" type transmission where transmission is not performed until an entire "packet" is formed. Excluding message classification and addressing information in frames 0 and 1, each multiframe will transmit 8 characters of the incoming low speed message at 9600 baud. Each multiframe occupies 0.2583 seconds $$\left( 10 \text{ frames} \times 31 \frac{\text{characters}}{\text{frame}} \div 1200 \frac{\text{characters}}{\text{second}} \right) \text{ and}$$

$$\text{during this time 7.75 characters} \left( 30 \frac{\text{characters}}{\text{second}} \times .2583 \text{ sec} \right)$$

will arrive on the low speed channel. Thus, the multiframe size is chosen to be slightly faster than the incoming channel so as to stay ahead of the sources. This allows real time organization of the multiframe. Accordingly, throughput delay is kept to a minimum.

Each cell of the multiframe contains a single 7 bit character, for example, an ASCII character as shown in Table II, plus 1 bit of parity, for example, odd parity. Odd parity is where the total count of logical ones in a character of 8 bits is always an odd number. The central computer 10 generates the multiframe in real time as the data is received, inserts the data and immediately scans the data out for transmission. A scan is started from left to right, beginning with row zero and then continuing with row one through row nine. The local computer 26 scans the received multiframe, extracts messages for itself, inserts local messages and forwards the multiframe to the FM transmitter 28 for transmission to the individual receivers 32. Each receiver selects those characters belonging to messages addressed to itself.

In order to synchronize the local stations and the individual receivers, a synchronization column is provided. In the synchronous version shown in FIG. 2, a "frame lock" is provided in order to allow the local stations and the individual receivers to recognize where each character is located in the multiframe matrix. In FIG. 2, a frame lock is created by placing only the sync character S in column 0 of the multiframe. In order to determine where a multiframe begins, another character, other than the sync character, shown in FIG. 2 as $\overline{S}$, is placed in column 0, row 0. If ASCII code is employed, the character decimal 22 is used, as can be determined from a review of Table II, which shows the ASCII character set.

TABLE II

| ASCII Char. | Oct | Nov | Dec | ASCII Char. | Oct | Nov | Dec |
|---|---|---|---|---|---|---|---|
| NULL | 000 | 00 | 0 | @ | 100 | 40 | 64 |
| SOH | 001 | 01 | 1 | A | 101 | 41 | 65 |
| STX | 002 | 02 | 2 | B | 102 | 42 | 66 |
| ETX | 003 | 03 | 3 | C | 103 | 43 | 67 |
| EOT | 004 | 04 | 4 | D | 104 | 44 | 68 |
| ENQ | 005 | 05 | 5 | E | 105 | 45 | 69 |
| ACK | 006 | 06 | 6 | F | 106 | 46 | 70 |
| BELL | 007 | 07 | 7 | G | 107 | 47 | 71 |
| BS | 010 | 08 | 8 | H | 110 | 48 | 72 |
| HT | 011 | 09 | 9 | I | 111 | 49 | 73 |
| LF | 012 | 0A | 10 | J | 112 | 4A | 74 |
| VT | 013 | 0B | 11 | K | 113 | 4B | 75 |
| FF | 014 | 0C | 12 | L | 114 | 4C | 76 |
| CR | 015 | 0D | 13 | M | 115 | 4D | 77 |
| SO | 016 | 0E | 14 | N | 116 | 4E | 78 |
| SI | 017 | 0F | 15 | O | 117 | 4F | 79 |
| DLE | 020 | 10 | 16 | P | 120 | 50 | 80 |
| DC1 | 021 | 11 | 17 | Q | 121 | 51 | 81 |
| DC2 | 022 | 12 | 18 | R | 122 | 52 | 82 |
| DC3 | 023 | 13 | 19 | S | 123 | 53 | 83 |
| DC4 | 024 | 14 | 20 | T | 124 | 54 | 84 |
| NAK | 025 | 15 | 21 | U | 125 | 55 | 85 |
| SYNC | 026 | 16 | 22 | V | 126 | 56 | 86 |
| ETB | 027 | 17 | 23 | W | 127 | 57 | 87 |
| CAN | 030 | 18 | 24 | X | 130 | 58 | 88 |
| EM | 031 | 19 | 25 | Y | 131 | 59 | 89 |
| SUB | 032 | 1A | 26 | Z | 132 | 5A | 90 |
| ESC | 033 | 1B | 27 | [ | 133 | 5B | 91 |
| FS | 034 | 1C | 28 | \ | 134 | 5C | 92 |
| GS | 035 | 1D | 29 | ] | 135 | 5D | 93 |
| RS | 036 | 1E | 30 | * | 136 | 5E | 94 |
| OS | 037 | 1F | 31 | — | 137 | 5F | 95 |
| space | 040 | 20 | 32 | ' | 140 | 60 | 96 |
| ! | 041 | 21 | 33 | a | 141 | 61 | 97 |
| " | 042 | 22 | 34 | b | 142 | 62 | 98 |
| # | 043 | 23 | 35 | c | 143 | 63 | 99 |
| $ | 044 | 24 | 36 | d | 144 | 64 | 100 |
| % | 045 | 25 | 37 | e | 145 | 65 | 101 |
| & | 046 | 26 | 38 | f | 146 | 66 | 102 |
| ' | 047 | 27 | 39 | g | 147 | 67 | 103 |
| ( | 050 | 28 | 40 | h | 150 | 68 | 104 |
| ) | 051 | 29 | 41 | i | 151 | 69 | 105 |
| = | 052 | 2A | 42 | j | 152 | 6A | 106 |
| + | 053 | 2B | 43 | k | 153 | 6B | 107 |
| , | 054 | 2C | 44 | l | 154 | 6C | 108 |
| — | 055 | 2D | 45 | m | 155 | 6D | 109 |
| . | 056 | 2E | 46 | n | 156 | 6E | 110 |
| / | 057 | 2F | 47 | o | 157 | 6F | 111 |
| 0 | 060 | 30 | 48 | p | 160 | 70 | 112 |
| 1 | 061 | 31 | 49 | q | 161 | 71 | 113 |
| 2 | 062 | 32 | 50 | r | 162 | 72 | 114 |
| 3 | 063 | 33 | 51 | s | 163 | 73 | 115 |
| 4 | 064 | 34 | 52 | t | 164 | 74 | 116 |

TABLE II-continued

| ASCII Char. | Oct | Nov | Dec | ASCII Char. | Oct | Nov | Dec |
|---|---|---|---|---|---|---|---|
| 5 | 065 | 35 | 53 | u | 165 | 75 | 117 |
| 6 | 066 | 36 | 54 | v | 166 | 76 | 118 |
| 7 | 067 | 37 | 55 | w | 167 | 77 | 119 |
| 8 | 070 | 38 | 56 | x | 170 | 78 | 120 |
| 9 | 071 | 39 | 57 | y | 171 | 79 | 121 |
| : | 072 | 3A | 58 | z | 172 | 7A | 122 |
| ; | 073 | 3B | 59 | [ | 173 | 7B | 123 |
| < | 074 | 3C | 60 | \| | 174 | 7C | 124 |
| — | 075 | 3D | 61 | ] | 175 | 7D | 125 |
| > | 076 | 3D | 62 | - | 176 | 7E | 126 |
| ? | 077 | 3F | 63 | DCL | 177 | 7F | 127 |

Message group addressing information is sent in row zero and row one, except for column zero which, as noted, is used for synchronization purposes. Type of message information is contained in row zero and is depicted in FIG. 2 by the symbols a0 (TYPE 0), a1 (TYPE 1), a2 (TYPE 2), a3 (TYPE 3) and a4 (TYPE 4). Thus, the multiframe shown in FIG. 2 illustrates all five types of messages. Of course, a transmitted multiframe need not include all five types of messages if they were not received for insertion into the multiframe. In addition to message type information these symbols also contain partial group addressing information. If ASCII characters are used, the characters used in row zero for message type information and group addressing are chosen from the decimal characters, starting at 33 up through 126 (see Table II). Characters below decimal 33 and the character decimal 127 are used for special purposes, to be described below. The exact allocation of the number of usable ASCII characters for a0, a1, a2, a3 and a4 is furthermore dynamically controlled. For example, if the 79 (decimal 48 to decimal 126 inclusive) usable ASCII characters were allocated so that 30 were for partial group addressing of message TYPE 3, then there will be 49 available for message TYPE 1. Thus for:

TYPE 0 Messages, the range of a0 is 33 only
TYPE 1 Messages, the range of a1 is 48 to 96
TYPE 2 Messages, the range of a2 is 34 only
TYPE 3 Messages, the range of a3 is 97 to 126
TYPE 4 Messages, the range of a4 is 35 only Row one is the second half of the group address (b0, b1, b2 and b3) and these symbols are chosen from the decimal ASCII characters from Table II, which yields 79 usable characters between 48 and 126 inclusive.

TYPE 0 through 3 messages are constrained in a single column because they are all low speed. The individual subscriber address for TYPE 0, 1, 2 and 3 messages is sent as part of the message, thereby permitting unlimited address flexibility. The message style is called block mode and is shown in Table III. The message is in three parts: A header, the text and an error check. If ASCII characters are employed, the key characters used to punctuate the three message parts are: Start of Header—SOH (Decimal 1), Start of Text—STX (Decimal 2), End of Text—ETX (Decimal 3) and End of Transmission—EOT (Decimal 4). The address for block mode messages is sent in the header and may be several safe characters long. Safe characters are defined as those between Decimal 33 and Decimal 126 inclusive of the ASCII character set shown in Table II.

TABLE III

SOH

TABLE III-continued

```
        address
           .
           .
           .
         STX
           .
           .
           .
         text
           .
           .
           .
         ETX
      error check
           .
         ETB
         EOT
```

Once a TYPE 0 message has been assigned a column (as close to column one as possible) it continues to occupy the same column until the next frame after the message completes. TYPE 0 messages may be assigned into columns 1 though 5, for example, as shown in FIG. 2.

TYPE 1 messages are also assigned one column and only then if there are characters waiting to be sent. They may appear in any column between TYPE 0 and TYPE 2 messages. One message may not be inserted twice in the same frame. In FIG. 2, TYPE 1 messages are shown in columns 6–9.

TYPE 2 local messages are treated the same way as TYPE 0. The transmission from the central site simply reserves at least three columns after the last TYPE 1 message. TYPE 2 messages are shown in columns 10–19.

TYPE 3 local messages are treated the same way as TYPE 1 messages. They are shown in columns 20–23.

TYPE 2 and 3 messages are inserted into the multiframe by local computer 26 in spaces reserved by central computer 10.

TYPE 4 messages are sent one at a time. They occupy all unused columns, at least three. In FIG. 2, TYPE 4 messages are shown in columns 24–30. No addressing information will be found in row one in those columns assigned to TYPE 4 messages. The message is of the block type as shown in Table III, which means the message includes the individual subscriber address.

Characters taken sequentially from a message TYPE 0, 1, 2 or 3 are placed in a single column of the frame beginning at row two until row nine. More than one TYPE 0, 1, 2 or 3 messages can appear, but each such message can only occupy a single column. If the message has less than eight characters, then fill characters are placed after the message characters through to row nine. In a preferred version using ASCII code, the fill character is ASCII decimal 21 (NAK) but this may be changed for best spectral response.

Characters taken sequentially from a TYPE 4 message are placed along a row, beginning with row one and continuing through row nine. Accordingly, TYPE 4 messages are inserted from left to right, top to bottom. If the message does not have enough characters to fill the space, then the fill character is employed.

Certain ASCII characters may be reserved for system use and may not be used in the message, its address or for control. These characters are as shown in Table IV:

TABLE IV

| ASCII Character | Decimal Value | Description |
|---|---|---|
| NULL | 0 | |
| DLE | 16 | |
| DC1 | 17 | Replication |
| DC2 | 18 | Replication |
| DC3 | 19 | Replication |
| DC4 | 20 | Replication |
| NAK | 21 | Fill Character |
| SYNC | 22 | Frame Lock |
| CAN | 24 | Void Frame and Repeat |
| SUB | 26 | Triple Numeral or Space Compressions |
| DEL | 127 | |

Certain ASCII characters are furthermore reserved for block message use and may not be used in the message or for addressing, as shown in Table V:

TABLE V

| ASCII Character | Decimal Value |
|---|---|
| SOH | 1 |
| STX | 2 |
| ETX | 3 |
| EOT | 4 |
| ETB | 23 |
| ESC | 27 |

The replication and compression functions specified in Table IV are as follows. If an ASCII character in a message is a number (Decimal 48 through Decimal 57), the system will send the number three times but remove the repetition after transmission, so that at best a two out of three decision may be employed to guard from error.

If the message has several consecutive space characters (ASCII Decimal 32), then a coding scheme is used to reduce the total number of space characters sent. Use is made of the characters:
DC1: Weight 2 Spaces
DC2: Weight 3 Spaces
DC3: Weight 4 Spaces
DC4: Weight 6 Spaces The above describes the transmission of data in synchronous format, i.e., where data transmission is synchronized with an external clock signal.

A simpler receiver design results if asynchronous, or start-stop transmission is used, however. This, of course, results in a lower number of characters per second throughput. In FIG. 3, the asynchronous multiframe format is shown. Features of the asynchronous system will be described below where they are different than in the above description.

Synchronization in the asynchronous system is achieved by sending one or more SYNC characters at the start of each frame in column 0 followed by the frame number in Column 1. A multiframe may contain 10 frames or rows, as shown.

In a preferred embodiment, a maximum of 24 columns is allowed, although less than 24 columns may be transmitted during low density traffic periods. The form of the data messages in the asynchronous embodiment is whown in Table VI. In Table VI, Cs is a separator character which separates the portions of the address and "Type" is two ASCII characters which indicate if numerals will be repeated three times and if spaces are compressed or transmitted as found in the text, as discussed above.

TABLE VI

| |
|---|
| SOH |
| Address 1 |
| Cs |
| Address 2 |
| Cs |
| Type |
| STX |
| . |
| . |
| . |
| Text |
| . |
| . |
| ETX |
| Error Check |
| ETB |
| EOT |

If ASCII code is employed, thirty-three ASCII characters are never used in the message text but are reserved for signalling only. These characters are sometimes referred to as illegal characters. In the described system, the purpose of these characters is described in Table VII.

TABLE VII

| ASCII Character (Decimal) | Name | Purpose |
|---|---|---|
| 0 | NULL | Unused |
| 1 | SOH | First character in a Block Message |
| 2 | STX | Text of message follows |
| 3 | ETX | Text has finished |
| 4 | EOT | Last character in a Block Message |
| 5 | ENQ | Unused |
| 6 | ACK | Unused |
| 7 | Bell | Unused |
| 8 | BS | Unused |
| 9 | HT | Unused |
| 10 | LF | Unused |
| 11 | VT | Unused |
| 12 | FF | Unused |
| 13 | CR | Unused |
| 14 | SO | Unused |
| 15 | SI | Unused |
| 16 | DLE | Unused |
| 17 | DC1 | Two spaces, used with text space compression |
| 18 | DC2 | Three spaces, used with text space compression |
| 19 | DC3 | Four spaces, used with text space compression |
| 20 | DC4 | Six spaces, used with text space compression |
| 21 | NAK | Fill character, used anywhere in Frame for empty |
| 22 | SYNC | Synchronization, sent in column zero of every Frame |
| 23 | ETB | Last character of block check code |
| 24 | CAN | Cancel whatever is in progress |
| 25 | EM | Clears 'triple numeral' or 'space compression' |
| 26 | SUB | Sets up 'triple numeral' or 'space compression' |
| 27 | ESC | Unused |
| 30 | RS | Unused |
| 31 | US | Unused |
| 127 | DEL | Unused |

Fifteen ASCII characters are reserved for special signalling purposes. These characters are in addition to the special characters ASCII decimal 0 through 31 and 127, shown in Table VII. The special signalling characters are described in Table VIII.

TABLE VIII

| ASCII/ Character (Decimal) | Purpose |
|---|---|
| 33 | If found in row zero, Low Speed Block Message |
| 34 | If found in row zero, Blank Column. Could be used for local message. |
| 35 | If found in row zero, High Speed Block Message. |
| 36 | Unused |
| 37 | Address separator, used in Block Messages. |
| 39 | Unused |
| 40 | Unused |
| 41 | Unused |
| 42 | Unused |
| 43 | Unused |
| 44 | Unused |
| 45 | Unused |
| 46 | Unused |
| 47 | Unused |

In Tables VII and VIII, the designation "unused" means that the particular character is not used in the preferred embodiment of the invention, although, of course, if a particular function becomes necessary, such character could be assigned such additional function.

As with the synchronous version, a0 through a4 in FIG. 3 represent the different message types, TYPE 0 through TYPE 4. R0 through R9 are the ASCII characters 48 through 57 decimal and designate the frame number. a0 is decimal 33 to denote a low speed control message. b0 is a multiframe number from decimal 048 through 126. a1 and b1 together form an address for subscriber messages taken from ASCII characters 048 through 126. a2 is decimal 034 to denote to the local station columns available for local message insertion. a3 and b3 are chosen from the ASCII characters 048 through 126, and form an address for locally inserted messages. a4 is decimal 035 to denote a high speed message. Z denotes a low speed text message, m a high speed text message, y a low speed control message and x is a fill character which can be replaced by local low speed messages.

A flow chart of the program steps employed by the microprocessor included in each of the individual receivers 32 or at the local station 25 to extract messages addressed to itself is shown in FIGS. 4a through 4m for the asynchronous transmission format. The microprocessor is pre-programmed to accept received ASCII characters and to extract text characters intended for the station where it functions. Text characters are identified through an addressing scheme and are used to make address changes. The output rate of text characters will depend on the requirements of the recipient machine.

The program begins with a general clear and reset of all variables, as shown in FIG. 4a. In the flow charts, a circled 1 indicates a return to the program start. The symbols used in the flow charts of FIGS. 4a thorugh 4m are indicated in Table IX.

TABLE IX

| | Definition of Flow Chart Symbols |
|---|---|
| A0 | Half of Group Address (1st Row). |
| A1 | Half of Group Address (2nd Row). |
| BCC | Block Check Character. |
| BM | Block Mode Variable marking Block Message State: 0 = Idle Mode 1 = Search for SOH |

TABLE IX-continued
Definition of Flow Chart Symbols

| | |
|---|---|
| | 2 = Decode Header |
| | 3 = Output Text |
| | 4 = Error Check using BCC. |
| C | ASCII Input 8-Bit Character. |
| C0 | Individual Address Character in Frame 0. |
| Cs | Separator Character after Block Message Address. |
| d | Means Decimal. |
| EOT | End of Transmission Character (ASCII 004 Decimal). |
| ETB | End of Text Block Character (ASCII 023 Decimal). |
| ETX | End of Text Character (ASCII 003 Decimal). |
| F | Variable marking column where message is. |
| Fn | Counter Marking column of incoming Frame. |
| k, kk, kkk | General Counters. |
| m | General State marking variable. |
| Rn | Counter marking Row or Frame. |
| R0 | ASCII Character for Row Zero (sent in Column One). |
| R1 | ASCII Character for Row One (sent in column One). |
| S | Text Space Mode (1 = Coded, 0 = Uncoded). |
| SOH | Start of Header Character (ASCII 001 Decimal). |
| STX | Start of Text Character (ASCII 002 Decimal). |
| T | Text Numerals Mode (1 = Triple, 0 = Send Once). |
| Text | All characters forming the body of a message. |

In FIG. 4a, the microprocessor is first initialized at step 100. At step 102, the program waits for an interrupt, which indicates that an incoming character has been received. Once the interrupt is received, the processor is ready to begin processing that character of the incoming message. If an interrupt is not received, then the program is reinitialized after a time-out occurs.

At step 106, the program searches for the SYNC character. Once received, and after waiting for an interrupt at 108, the next character in a frame is received, and again checked at 110 for whether it is the SYNC character. If it is not, the character is checked at 112 to determine whether the first frame is being received. This would be indicated by reception of the frame character R0. When the first frame is received, counter Rn is set to the frame number for the first frame, as shown at 114. At 116 the program again waits for an interrupt and after an interrupt is sensed, individual address and message type characters in frame 0 are checked. If the character is ASCII decimal 33, as shown at 120, the received message is a low-speed control message. If it is not, the received character is checked to determine whether it is a low speed subscriber message at 122, in which case the first half of the group address is checked to see if it matches the stored address. If not, the message is checked at 124 to determine if it is a high speed block message. An ASCII decimal 35 indicates that the message received is a high speed message. As indicated earlier, individual addresses are transmitted as part of the messages themselves. If no message is received, the processor is re-initialized to step 100.

FIGS. 4b-4f combined form the flow chart of the program implemented if a low speed control message is received, i.e. TYPE 0 through 3 messages which are not subscriber messages. This is indicated by point A in FIGS. 4a and 4b. The first step is to set a counter to mark the column where the message was received as shown at 126. At 128, the state of the block message is checked. The states of the block messages are indicated in Table IX. If the state is past its limit (BM>4) or if the idle mode (BM=0) is detected, the state is set to search mode, so that a search is made for the SOH character. This is indicated by step 130. If the block message state is within limits, a jump is made to 132. After waiting for an interrupt at 132, a check is again made for the SYNC character at step 136. If the SYNC character is again received, this indicates the start of a new frame and the termination of the prior one. Once the SYNC character is received, a wait for an interrupt is made at 137 and another check for SYNC is made at 139. If this check is negative, a check is again made to determine the row or frame number as shown at 140. If the frame is not the 0 frame, then the frame counter is incremented at 142 and the flow continues into FIG. 4c as shown by the letter N. If the received character indicates that frame 0 is being received, the program branches along line 144. Frame counter Rn is set to 0 and the column counter is set to column 1. This is indicated by step 146. After waiting for another interrupt at 148, a check is again made for a low speed control message at 152. If a low speed control message is indicated, the program branches back to point A. If not, a check is again made at 154 for the SYNC character to determine if a new frame has been entered. If a new frame has been entered, reentry is made into FIG. 4a at 9. If not, the program remains in a loop.

Figure 4B:
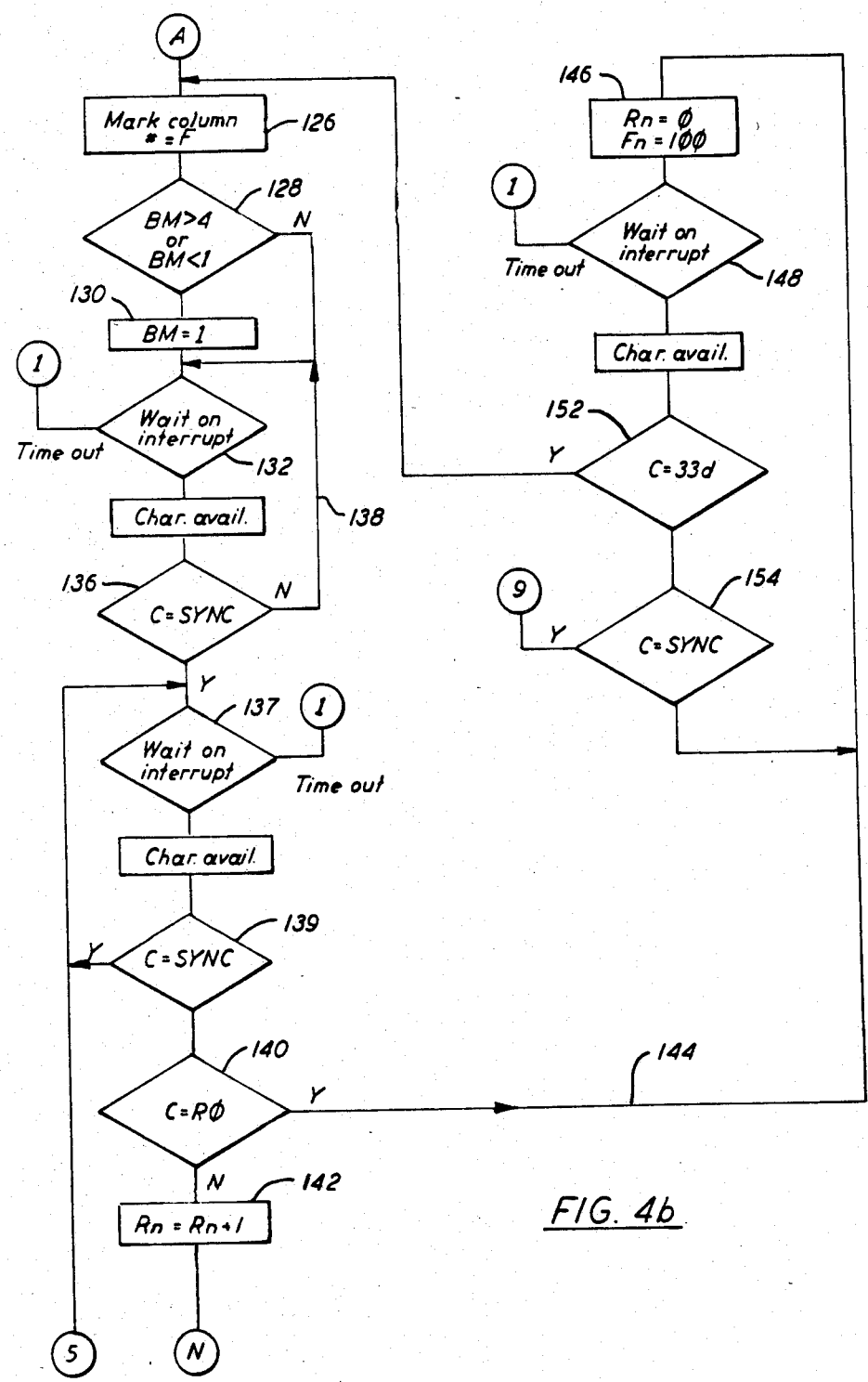
Figure 4C:
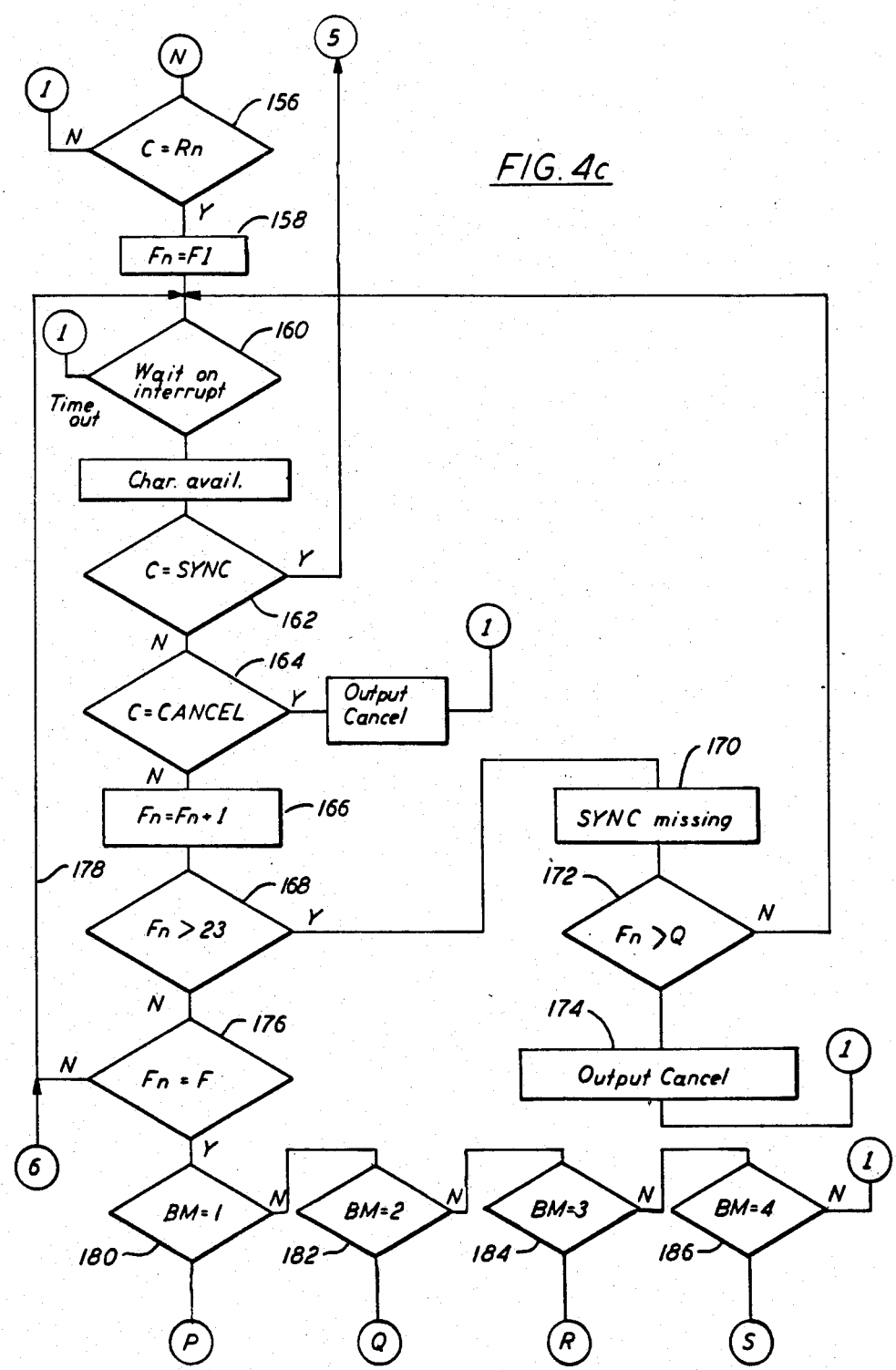

FIG. 4c shows the flow for those frames following frame 0. At 156, the incoming character is checked to determine if it equals the current state of the frame counter, e.g., frame 1. The column counter is set to column 1 at 158. If an interrupt is not received, the program branches to 1 as shown at 160. If an interrupt is received, the SYNC character is again searched for at 162. If found, the program reenters FIG. 4b at 5, and a new frame is entered. If not, a check is made to determine if the received character is CANCEL, at 164, in which case the system is reinitialized. At 166, the column counter is incremented. At 168, a check is made to determine if the last permissible column in the frame has been exceeded. If so, a determination is made that the SYNC character was missed at 170. If the column counter exceeds a number Q, which is set greater than 23, then the output is cancelled as shown by steps 172 and 174. Assuming the column counter has not exceeded the maximum permissible number of columns, the program next determines if it has reached the column where the message is, as shown by step 176. If it has not, it remains in a loop via line 178. If the column where the message is located has been reached, the block message state is determined at steps 180 to 186. The program then branches into the appropriate subroutine as determined by the block message state.

Figure 4D:
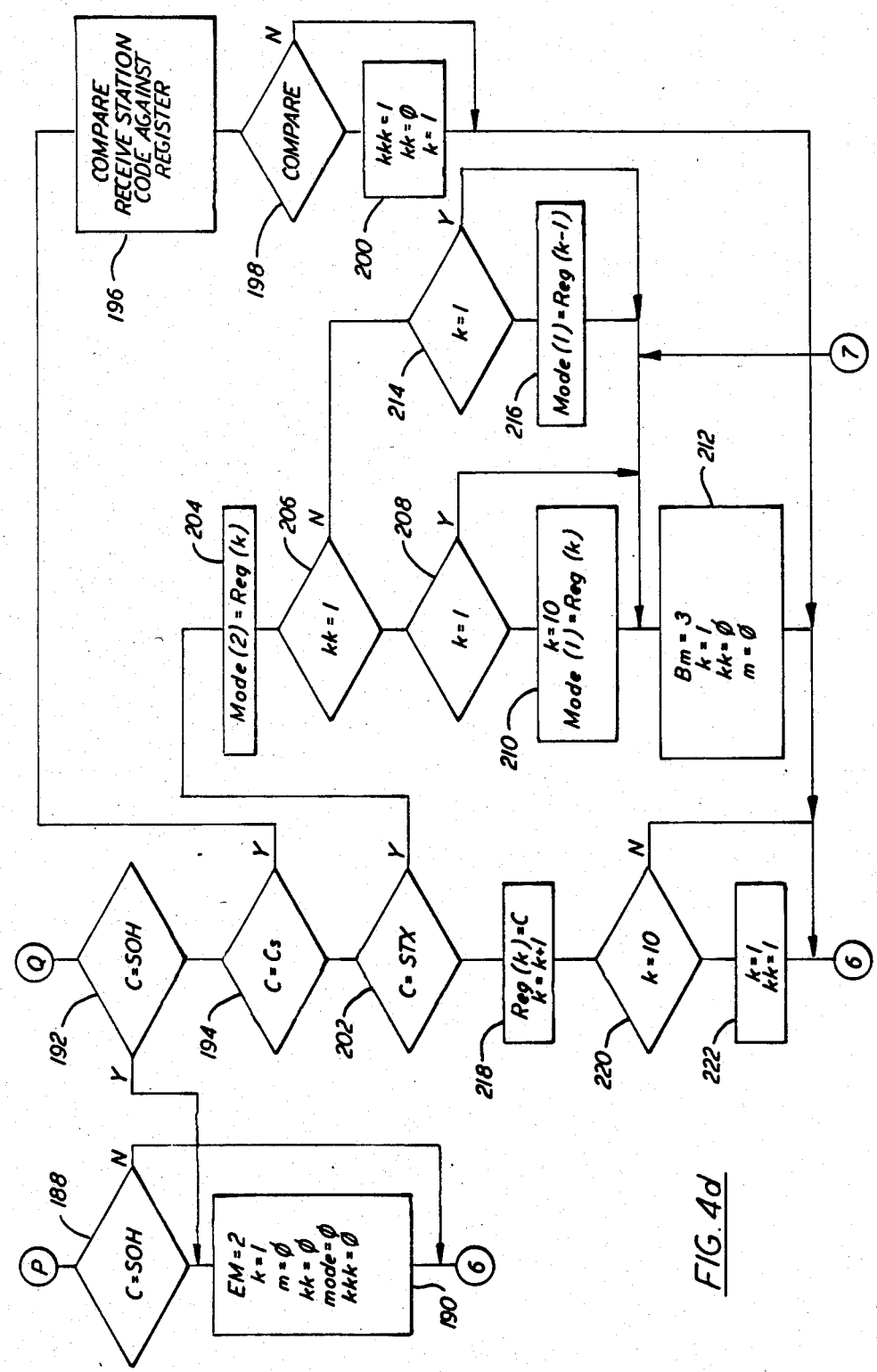

If the block message state is BM=1, point P in FIG. 4d is entered, in which case a check is made at 188 for the SOH character. If SOH is received, the block message state is set to 2 and internal counters are reset as shown at 190. After setting the block message state to 2 or if SOH is not received, the flow returns to point 6 in FIG. 4c and the program will enter point Q after determining at stem 182 that BM=2.

After entering point Q, a check for SOH will again be made at step 192. Assuming the received character is not SOH, a check is made at 194 for the separator character Cs after the block message address. (See Tables II, VI and IX). Characters are stored in a buffer until Cs is received. If Cs is received, the first half of the received address code is compared against an internal register code at 196. If the comparison at 198 is positive, counter kkk is set to one at 200, and an exit is made to point 6. The program will again reenter step 196 after proceeding through the flow chart of FIG. 4c to compare the second half of the group addresses and then return to point 6. If Cs is not received at step 194, a check is made at 202 for the start of text character STX. If the start of text character is received, a branch is made into the program steps defined by steps 204-216. In steps 204-216, the program determines whether a special transmission made is being used, i.e., mode (1) for text space mode and mode (2) for text numerals mode. See "Type" in Table VI. At step 212, the block mode variable is set to BM=3, i.e., the system is ready to output message text. The program then returns to point 6 in FIG. 4c. If STX is not received, steps 218-222 are performed and a return to point 6 is made.

After returning to point 6, the system cycles through the program steps defined by FIG. 4c. If BM=3, the program exits at step 184 to R in FIG. 4e. This subroutine checks for STX at 230. If not received, a check is made for ETX or end of text at 232. If ETX is not received, the presently received character is outputted at 234 and the error check BCC is computed. Once a character is outputted, a return is made to point 6 in FIG. 4c and each character is outputted in turn through the loop shown in FIGS. 4c and 4e until ETX is received, at which point BM is set to 4 at step 236. A return is then made to point 6 in FIG. 4c. Should STX have been received initially when entering FIG. 4e, a return is made to point 6 in FIG. 4c or the output is cancelled as an error and a return is then made to point 6 (Steps 238 and 240).

Figure 4E:
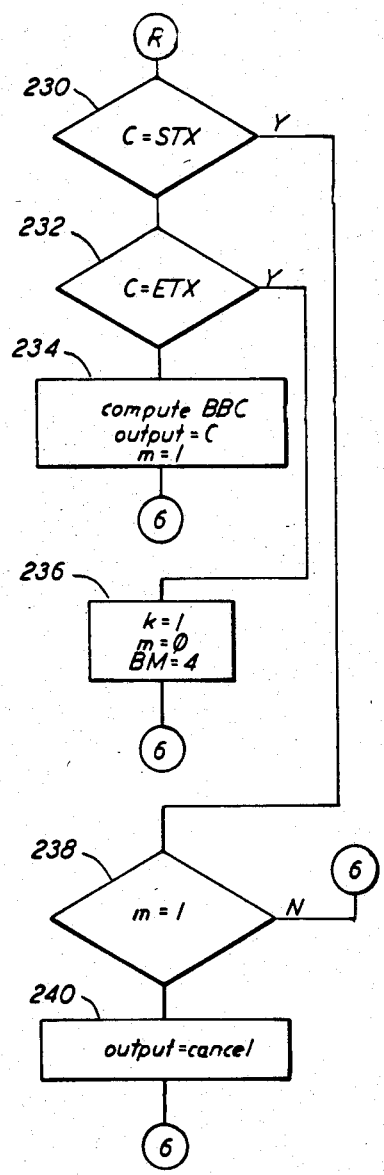
Figure 4F:
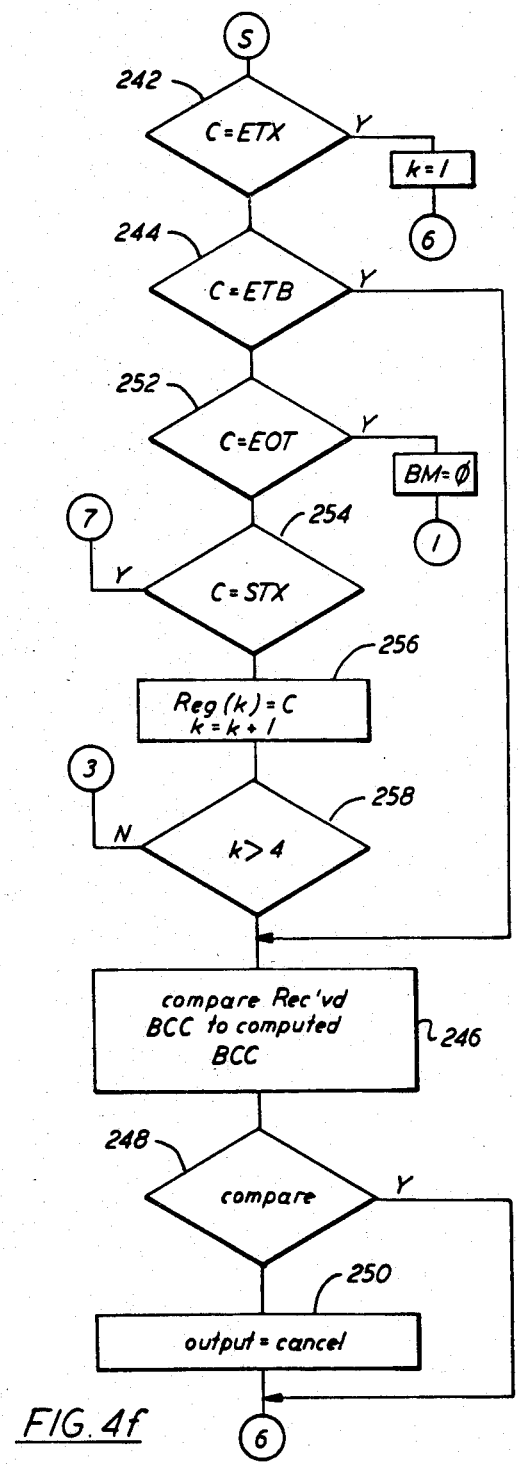

Assuming ETX has been received and the program has returned to point 6 in FIG. 4c, program control will eventually branch at 186 to point S in FIG. 4f. At 242 a check is made for ETX. If not received, a check is made for the end of Text Block Character or ETB at 244. If received, the computed BCC is compared to the received BCC at 246. If the comparison is positive, program control returns to point 6 in FIG. 4c. Otherwise the output is cancelled and the control returns to point 6. This is shown by steps 248 and 250.

If ETB is not received at 244, a check is made for the end of transmission character, or EOT, at 252. If received, BM is set to 0 and program control returns to point 1 in FIG. 4a, i.e., the system is re-initialized. If not received, a check is made for STX at 254. If received, program control is returned to point 7 in FIG. 4d. This resets BM to 3 so that text is again ready to be outputted. If STX is not received, steps 256 and 258 are entered. If counter K is greater than 4, the error codes are checked at 246. If not, program control branches to point 3 in FIG. 4j. Counter K is a general counter used to indicate the state of the block check character.

Figure 4G:
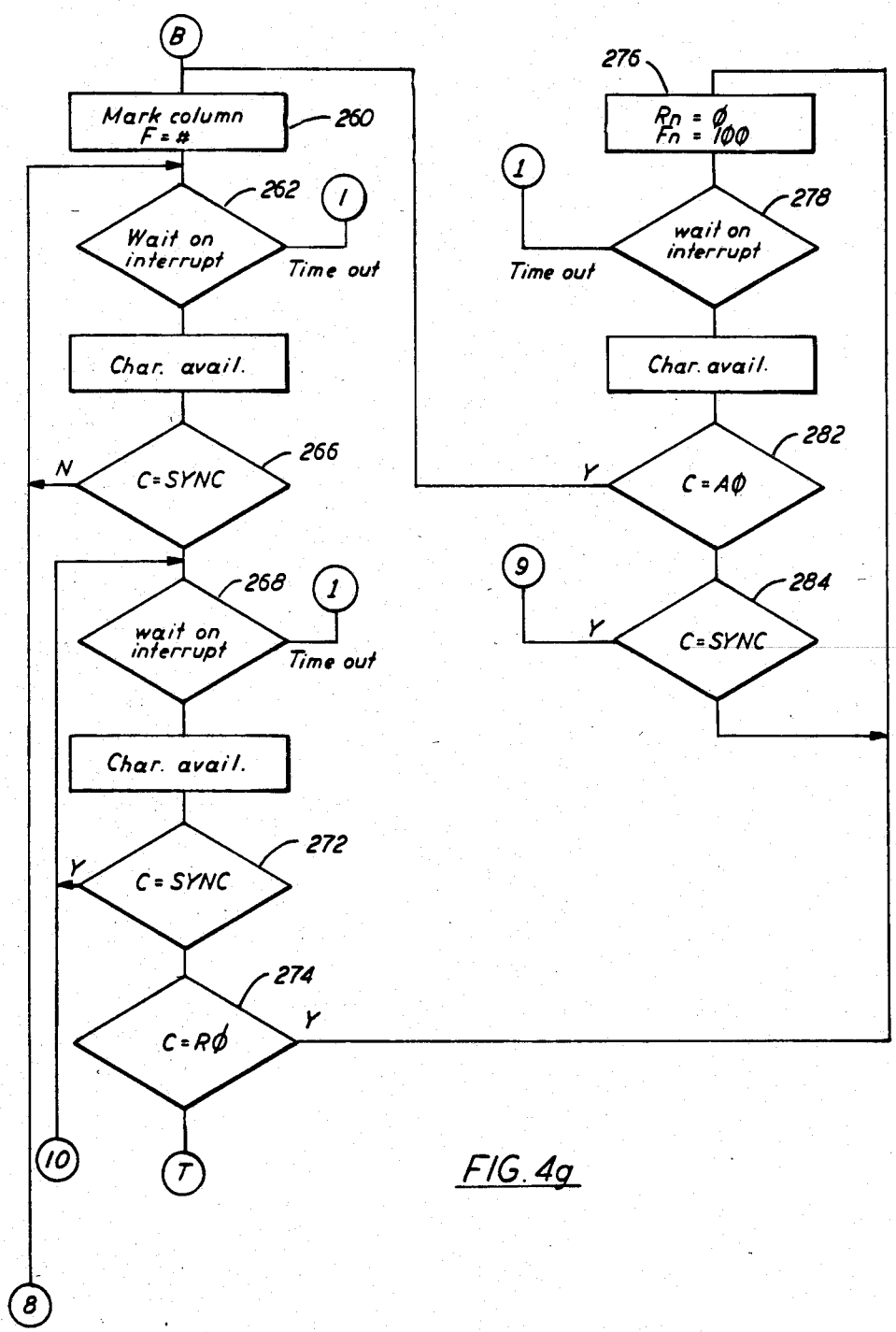

Should a low-speed subscriber message be received, program control from FIG. 4a flows from step 122 to point B in FIG. 4g.

Figure 4H:
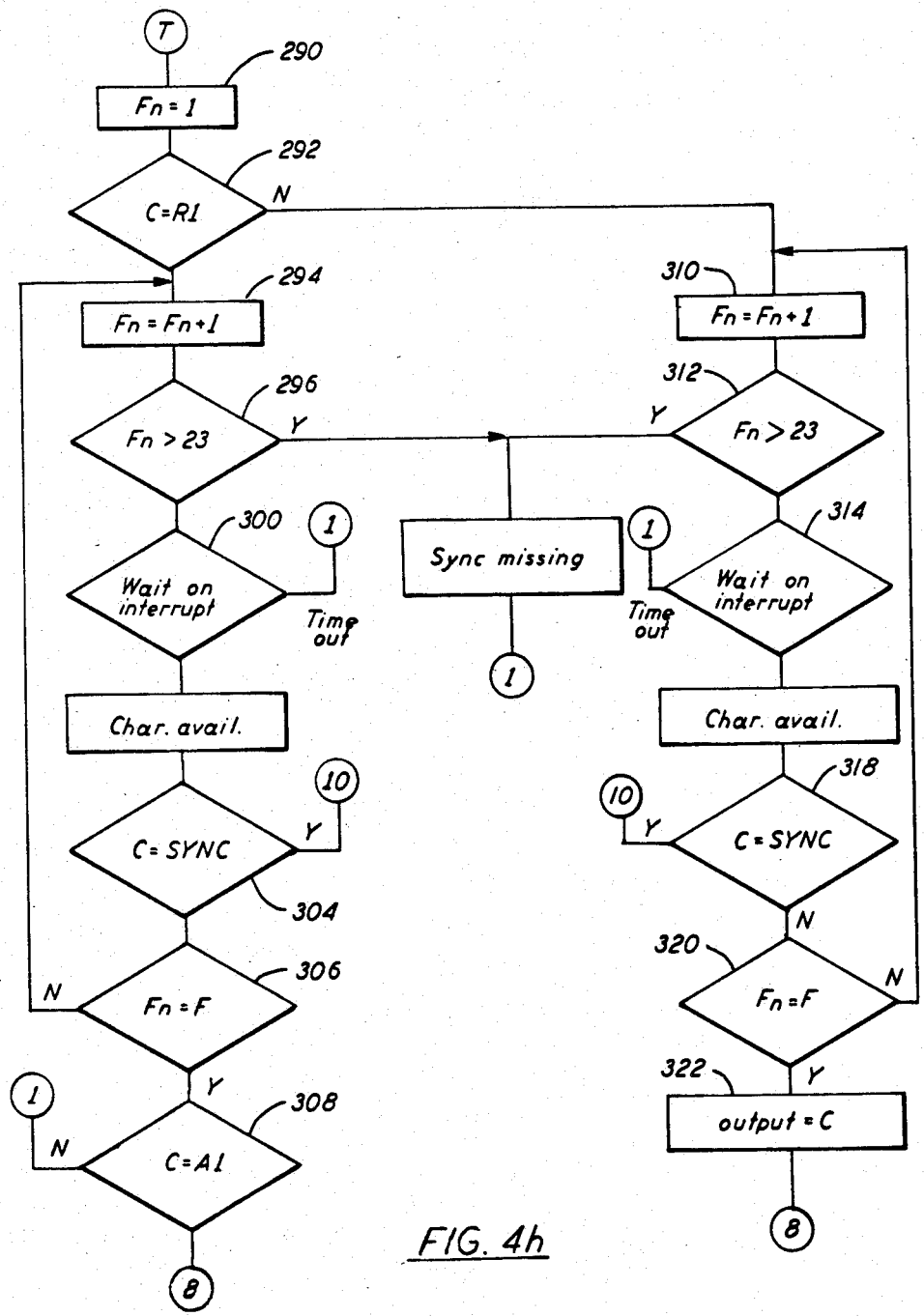

FIGS. 4g and 4h show the flow diagram for the processing of low speed subscriber messages, i.e., TYPE 0 through 3 messages which are not control messages. Entry to point B of FIG. 4g occurs after the first half of the group address is read at step 122 in FIG. 4a. At step 260, the column where the message occurs is stored. When an interrupt is detected at 262 and the next character is available, a check is made for the SYNC character at 266. If received, and after waiting for an interrupt at 268, another check is made for the SYNC character at 272. If received, the program stays in a loop until another character is received. At 274 a check is made for the character R0 denoting frame 0. If received, the program branches to 276, where the frame counter is set to 0 and the column counter is set to 1. After waiting for an interrupt at 278, a check is made for the first half of the group address at 282. If a match is made, the program branches back to 260. If not, the program rechecks for SYNC at 284, and until the SYNC character is received, remains in a loop unless the first half of the group address is again received at 282.

If, at step 274, the current frame is not the 0 frame, program control jumps to T in FIG. 4h. At 290, the column counter is set to 1. At 292, a check is made for frame 1. If frame 1 is being received, the column number is incremented at 294. A check is then made to see if the column number exceeds 23 at 296. If so, the SYNC character was missed and program control returns to step 104 as shown at 298. If the column number is not greater than 31, after an interrupt wait at 300, a check is again made for SYNC at 304. If received, control branches back to 10 in FIG. 4g. If not received, a determination is made at 306 whether the column number equals the column number where the message was found at 260. If it does, the second half of the group address is read at 308. If the address matches, program control returns to point 8 in FIG. 4g. and the program cycles to point T in FIG. 4g, thus returning to step 292 in FIG. 4h. If the second half of the address does not match, return is made to step 100.

If at step 292 the character received in column 1 is not the character representing Frame 1 (R1), the column counter is incremented at 310. Again, a check is made for an out-of-bounds column number at 312. After interrupt wait 314, a check is made for SYNC at 318. If not received, a check is made to determine if the proper column is reached at 320. If so, at step 322, the character in the column F where the message is located is outputted to a display device. Return is then made to point 8 in FIG. 4g, and the program again cycles through to step 322 to output the next character in the message.

Figure 4I:
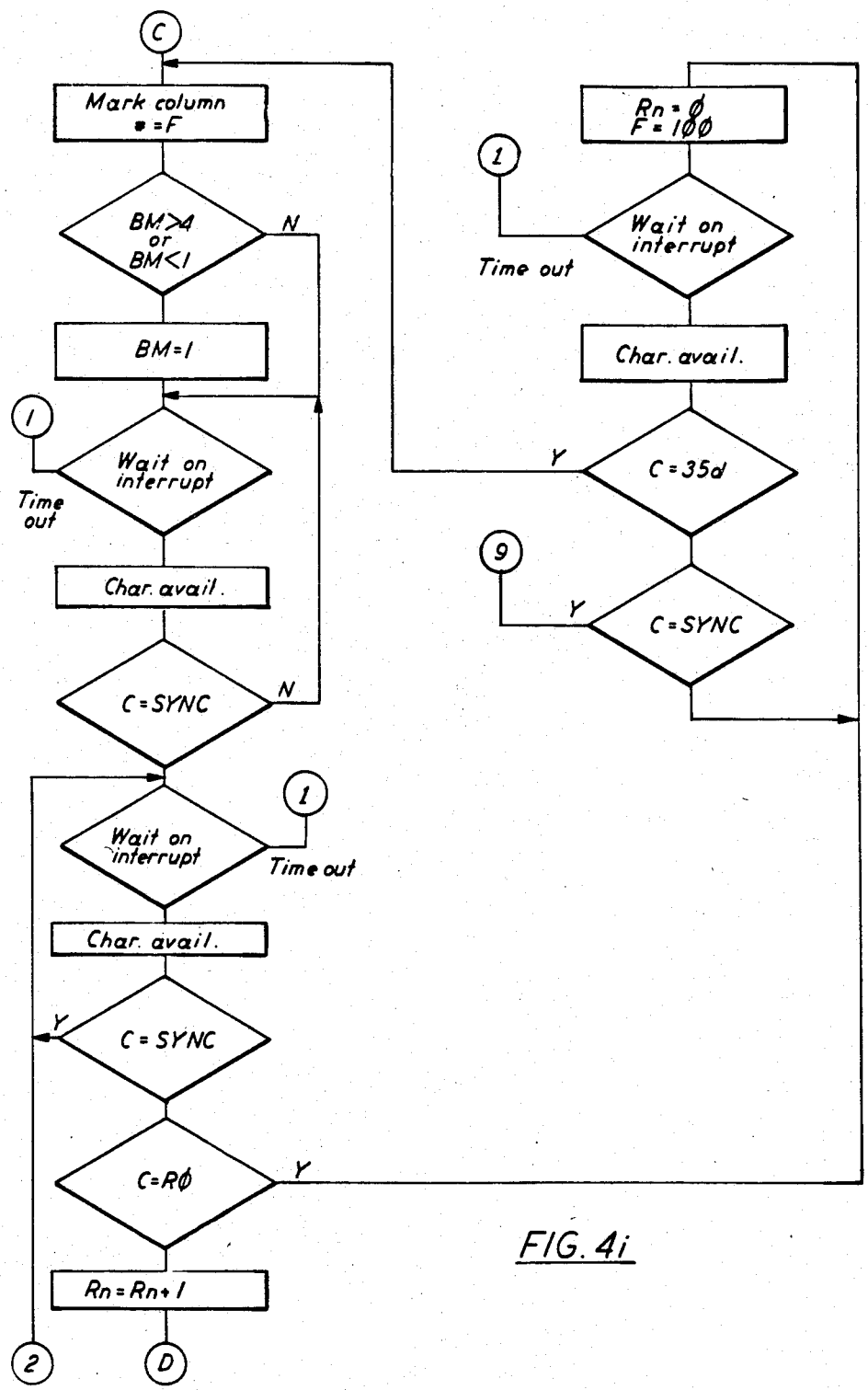
Figure 4J:
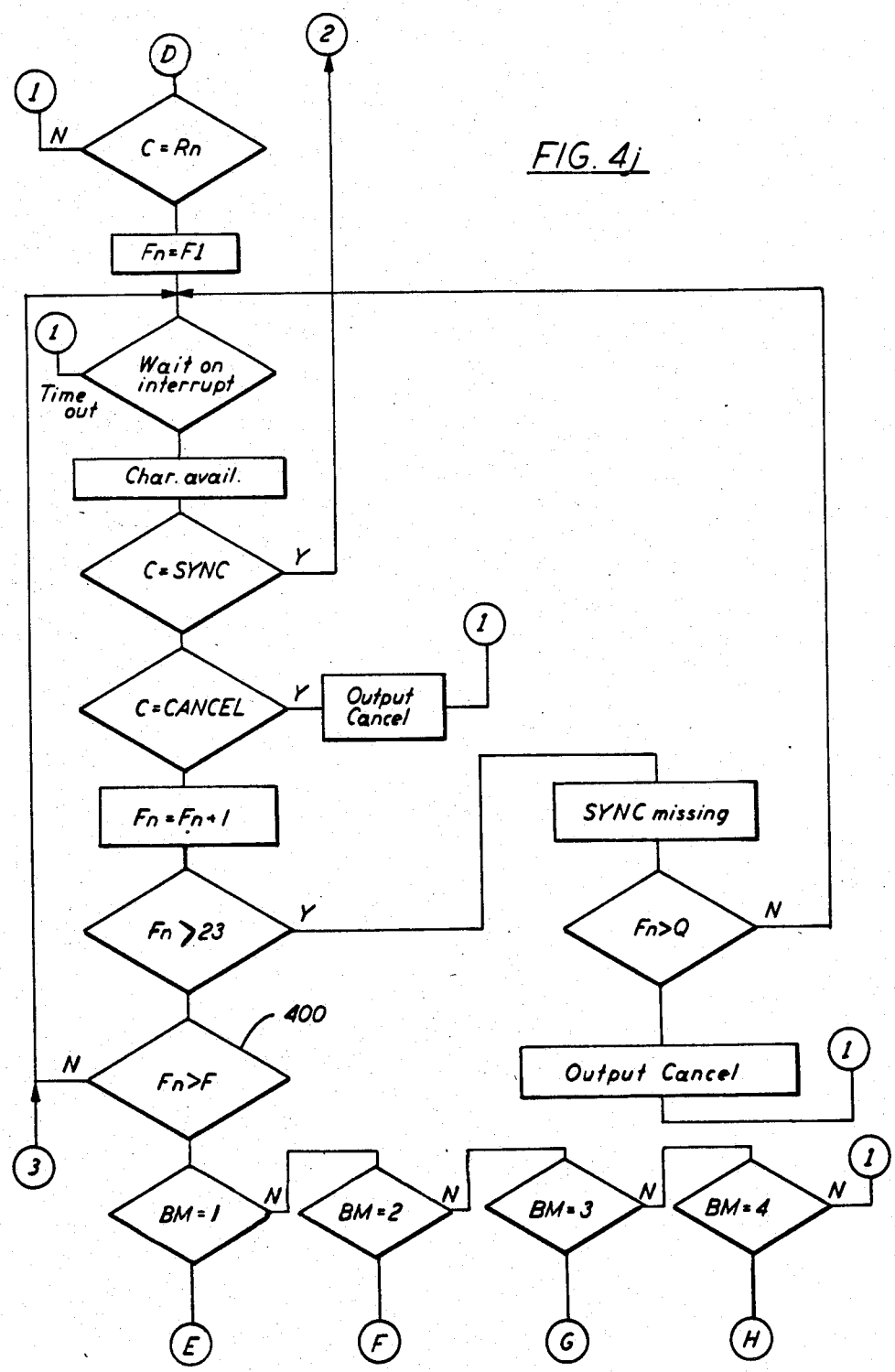
Figure 4K:
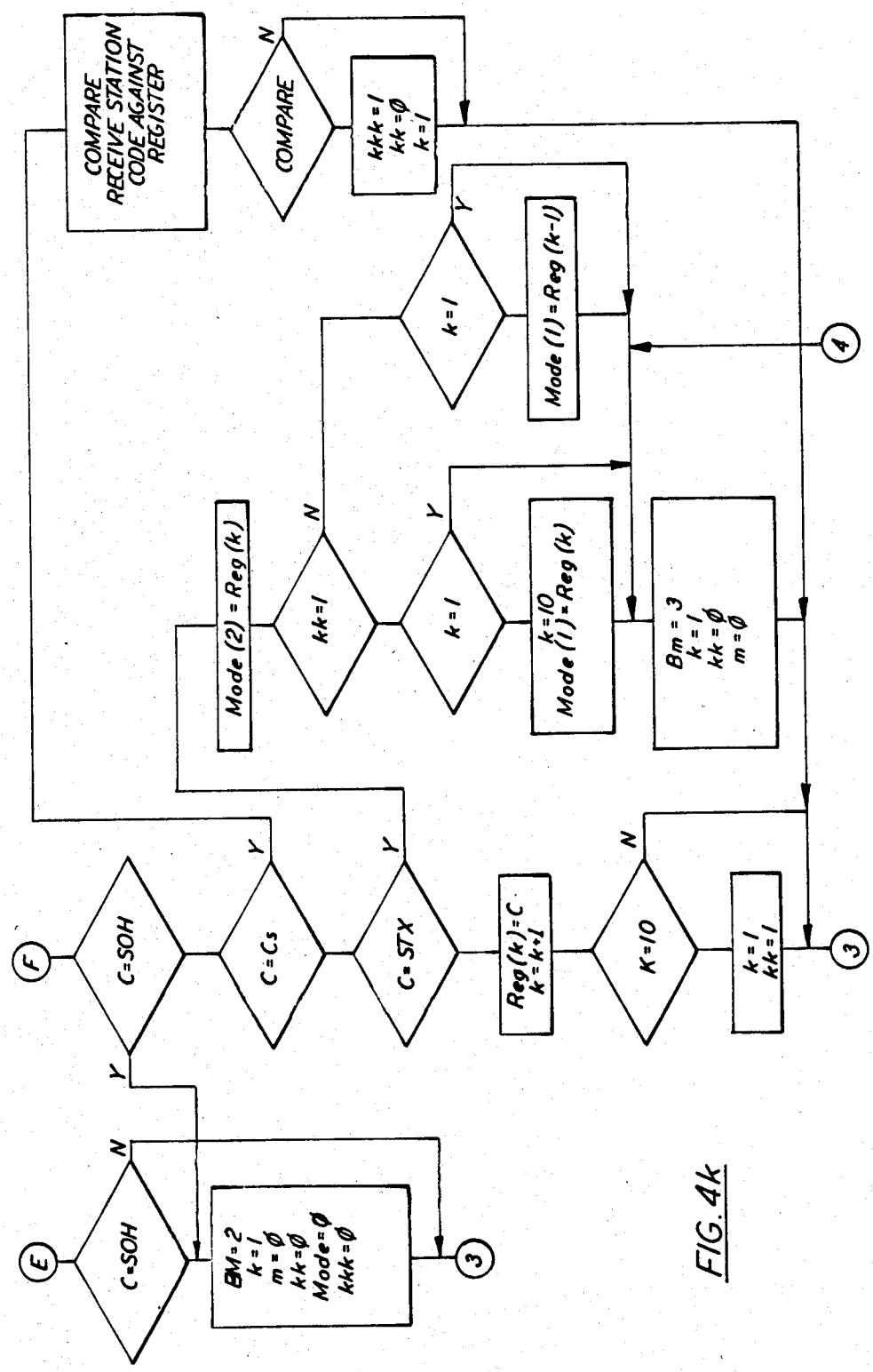
Figure 4L:
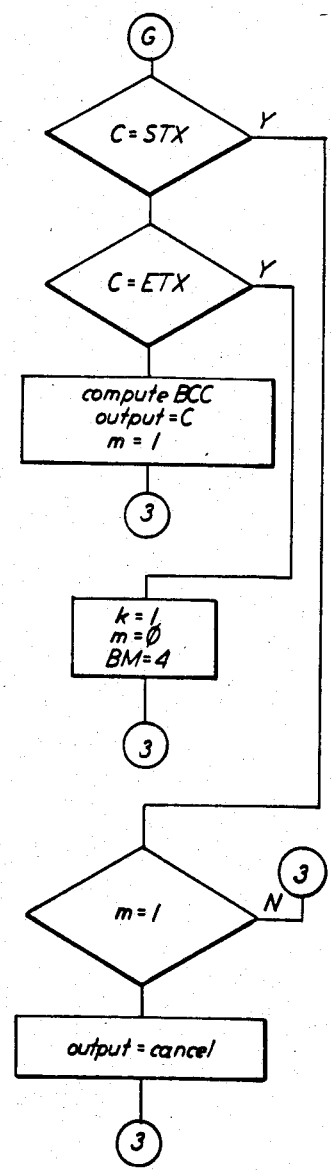
Figure 4M:
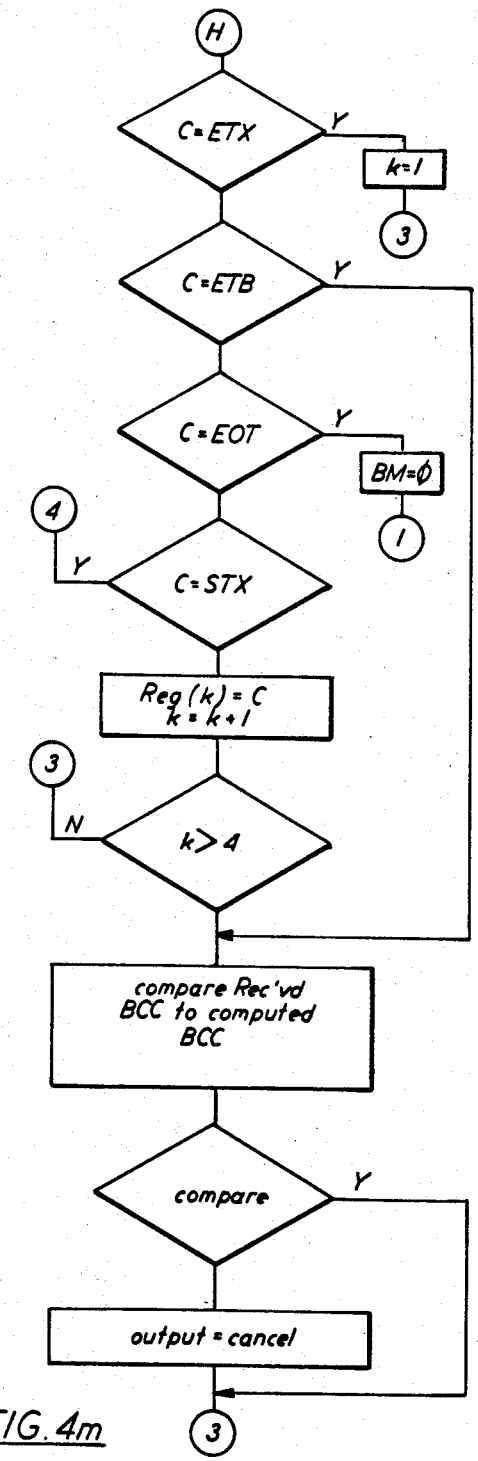

FIGS. 4a through 4m show the program flow for high speed messages. FIG. 4i is similar to FIG. 4b, except that it relates to the processing of a different message type. FIG. 4j is similar to FIG. 4c; FIG. 4k is similar to FIG. 4d; FIG. 4l is similar to FIG. 4e, and FIG. 4m is similar to FIG. 4f. One difference between the flow charts for high speed messages and low speed messages is shown in FIG. 4j. At step 400, the high speed message routine checks to determine if the column counter is greater than or equal to the column where the message was found, in contrast to step 176 in FIG. 4c, where only equality is determined. This is because high speed messages are inserted in serial fashion in successive columns rather than being located only in a single column. In other respects, the flowcharts are essentially the same as for low-speed control messages. Accordingly, these flow charts will be familiar to one who has read the description of FIGS. 4a to 4f and will not be described in further detail.

It should be noted that although the preferred embodiments of this invention illustratively utilize a bit rate of 9,600 bits/sec for transmission to receiver locations and that low speed bit rates have been defined as those up to 300 bits/sec and high speed bit rates as those between 300 and 4800 bits/sec, the principles of the present invention can be used to accommodate even higher transmission rates and data messages having higher bit rates.

Advantages of the present invention include the ability to transmit efficiently data messages of varying baud rates over a single data transmission medium. Additionally, the present invention provides maximum tolerance to burst errors, since the transmitted data messages are separated and reorganized in the multiframe matrix.

Furthermore, since the multiframes are transmitted as they are organized in real time, there is minimal throughput delay. The invention is also suitable for both synchronous and asynchronous protocols, thus allowing its use in a large number of different data communications systems.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A method for transmitting data from a first location to at least one receiver location comprising the steps of:
   receiving a plurality of data messages of varying bit rates at said first location;
   organizing said data messages into a multiframe matrix, said matrix including a plurality of columns, each column representing a period of time, and a plurality of rows, each row representing a frame of said matrix, individual characters of said data messages being selectively inserted into said columns of said matrix in real time;
   transmitting over a transmission medium, for each successive frame of said matrix, the characters in successive columns at a defined bit rate greater than the bit rates of any of said data messages; and
   decoding at each receiver location the transmitted matrix, messages which are addressed to a receiver location being available for display at said receiver location.

2. The method recited in claim 1 wherein the first row of said matrix contains information associated with the bit rates and the addresses of said data messages.

3. The method recited in claim 1 wherein said step of receiving comprises the step of receiving data messages having a bit rate of up to approximately 300 bits/sec and data messages having a bit rate between approximately 300 and approximately 4800 bits/sec.

4. The method recited in claim 1 wherein said defined bit rate is 9600 bits/sec.

5. The method recited in claim 1 wherein the first column of said matrix includes synchronizing information.

6. The method recited in claim 5 wherein said second column includes synchronizing information.

7. The method recited in claim 2 wherein said second row further includes addressing information.

8. The method recited in claim 1 wherein said plurality of data messages include control information for controlling associated equipment at said receiver location and subscriber information for display at said receiver location.

9. The method recited in claim 1 further including the step of relaying said transmitted matrix at an intermediate location between said first location and said receiver location.

10. The method recited in claim 9, further Including the step of inserting further messages into said matrix at said intermediate location.

11. The method recited in claim 10 wherein said plurality of data messages includes a first data communication having a first bit rate and a second data communication having a second higher bit rate.

12. The method recited in claim 11 wherein said first data communication is constrained to a single column of said matrix and said second data communication may occupy a plurality of columns.

13. The method recited in claim 11 wherein said first data communication may originate at said first location or at said intermediate location.

14. The method recited in claim 13 wherein said first data communication may be addressed to an individual one of said receiver locations or may be addressed to a group of said receiver locations.

15. The method recited in claim 11 wherein said plurality of data messages further includes additional data communications having said first bit rate, said data communications having said first bit rate being inserted into selected columns of said matrix, said data communications having said second bit rate being inserted into remaining columns of said matrix.

16. The method recited in claim 11 wherein said first bit rate is up to 300 bits/sec and said second bit rate is between approximately 300 and 4800 bits/sec.

17. The method recited in claim 1 wherein said step of transmitting comprises the step of modulating said matrix onto an F.M. broadcast radio station subcarrier.

18. A system for transmitting data from a first location to at least one receiver location comprising:
    means for receiving a plurality of data messages having varying bit rates at said first location;
    means for organizing said data messages into a mutltiframe matrix, said matrix including a plurality of columns, each column representing a period of time, and a plurality of rows, each row representing a frame of said matrix, individual characters of said data messages being selectively inserted into said columns of said matrix in real time;
    means for transmitting over a transmission medium, for each successive frame of said matrix, the characters in successive columns at a defined bit rate greater than the bit rate of any of said data messages; and
    means for decoding at each receiver location the transmitted matrix, messages which are addressed to a receiver location being available for display at said receiver location.

19. The system recited in claim 18 wherein the first row of said matrix contains information associated with the bit rates and the addresses of said data messages.

20. The system recited in claim 18 wherein said means for receiving comprises means for receiving data messages having a bit rate of up to approximately 300 bits/sec and data messages having a bit rate between approximately 300 and approximately 4800 bits/sec.

21. The system recited in claim 18 wherein said defined bit rate is 9600 bits/sec.

22. The system recited in claim 18 wherein the first column of said matrix includes synchronizing information.

23. The system recited in claim 22 wherein said second column includes synchronizing information.

24. The system recited in claim 19 wherein said second row further includes addressing information.

25. The system recited in claim 18 wherein said plurality of data messages include control information for controlling associated equipment at said receiver location and subscriber information for display at said receiver location.

26. The system recited in claim 18 further including means for relaying said transmitted matrix at an intermediate location between said first location and said receiver location.

27. The system recited in claim 26, further including means for inserting further messages into said matrix at said intermediate location.

28. The system recited in claim 27 wherein said plurality of data messages includes a first data communication having a first bit rate and a second data communication having a second higher bit rate.

29. The system recited in claim 28 wherein said first data communication is constrained to a single column of said matrix and said second data communication may occupy a plurality of coluumns.

30. The system recited in claim 28 wherein said first data communication may originate at said first location or at said intermediate location.

31. The system recited in claim 30 wherein said first data communication may be addressed to an individual one of said receiver locations or may be addressed to a group of said receiver locations.

32. The system recited in claim 28 wherein said plurality of data messages further includes additional data communications having said first bit rate, said data communications having said first bit rate being inserted into selected columns of said matrix.

33. The system reacted in claim 28 wherein said first bit rate is up to 300 bits/sec. and said second bit rate is between approximately 300 and 4800 bits/sec.

34. The system recited in claim 18 wherein said means for transmitting comprises means for modulating said matrix onto an F.M. broadcast radio station subcarrier.

35. A method for transmitting data from a first location to at least one receiver location comprising the steps of:
 receiving a plurality of data messages of varying bit rates at said first location;
 organizing said data messages into a multiframe matrix, said matrix including a plurality of columns, each column representing a period of time, and a plurality of rows, each row representing a frame of said matrix, individual characters of said data messages being selectively inserted into said columns of said matrix in real time, the first row of said matrix containing information associated with the bit rates and the addresses of said data messages;
 transmitting over a transmission medium, for each successive frame of said matrix, the characters in successive columns at a defined bit rate greater than the bit rates of any of said data messages; and
 decoding at each receiver location the transmitted matrix, messages which are addressed to a receiver location being available for display at said receiver location.

36. The method recited in claim 35 wherein said step of receiving comprises the step of receiving data messages having a bit rate of up to approximately 300 bits/sec and data messages having a bit rate between approximately 300 and approximately 4800 bits/sec.

37. The method recited in claim 35 wherein said defined bit rate is 9600 bits/sec.

38. The method recited in claim 35 wherein the first column of said matrix includes synchronizing information.

39. The method recited in claim 38 wherein said second column includes synchronizing information.

40. The method recited in claim 35 wherein said second row further includes addressing information.

41. The method recited in claim 35 wherein said plurality of data messages include control information for controlling associated equipment at said receiver location and subscriber information for display at said receiver location.

42. The method recited in claim 35 further including the step of relaying said transmitted matrix at an intermediate location between said first location and said receiver location.

43. The method recited in claim 42, further including the step of inserting further messages into said matrix at said intermediate location.

44. The method recited in claim 43 wherein said plurality of data messages includes a first data communication having a first bit rate and a second data communication having a second higher bit rate.

45. The method recited in claim 44 wherein said first data communication is constrained to a single column of said matrix and said second data communication may occupy a plurality of columns.

46. The method recited in claim 44 wherein said first data communication may originate at said first location or at said intermediate location.

47. The method recited in claim 46 wherein said first data communication may be addressed to an individual one of said receiver locations or may be addressed to a group of said receiver locations.

48. The method recited in claim 44 wherein said plurality of data messages further includes additional data communications having said first bit rate, said data communications having said first bit rate being inserted into selected columns of said matrix, said data communications having said second bit rate being inserted into remaining columns of said matrix.

49. The method recited in claim 44 wherein said first bit rate is up to 300 bits/sec and said second bit rate is between approximately 300 and 4800 bits/sec.

50. The method recited in claim 35 wherein said step of transmitting comprises the step of modulating said matrix onto an F.M. broadcast radio station subcarrier.

51. A system for transmitting data from a first location to at least one receiver location comprising:
 means for receiving a plurality of data messages having varying bit rates at said first location;
 means for organizing said data messages into a multiframe matrix, said matrix including a plurality of columns, each column representing a period of time, and a plurality of rows, each row representing a frame of said matrix, individual characters of said data messages being selectively inserted into said columns of said matrix in real time, the first row of said matrix containing information associated with the bit rates and the addresses of said data messages;
 means for transmitting over a transmission medium, for each successive frame of said matrix, the characters in successive columns at a defined bit rate greater than the bit rate of any of said data messages; and
 means for decoding at each receiver location the transmitted matrix, messages which are addressed to a receiver location being available for display at said receiver location.

52. The system recited in claim 51 wherein said means for receiving comprises means for receiving data messages having a bit rate of up to approximately 300 bits/- sec and data messages having a bit rate between approximately 300 and approximately 4800 bits/sec.

53. The system recited in claim 51 wherein said defined bit rate is 9600 bits/sec.

54. The system recited in claim 51 wherein the first column of said matrix includes synchronizing information.

55. The system recited in claim 54 wherein said second column includes synchronizing information.

56. The system recited in claim 51 wherein said second row further includes addressing inforamtion.

57. The system recited in claim 51 wherein said plurality of data messages include control information for controlling associated equipment at said receiver location and subscriber information for display at said receiver location.

58. The system recited in claim 51 further including means for relaying said transmitted matrix at an intermediate location between said first location and said receiver location.

59. The system recited in claim 58, further including means for inserting further messages into said matrix at said intermediate location.

60. The system recited in claim 59 wherein said plurality of data messages includes a first data communication having a first bit rate and a second data communication having a second higher bit rate.

61. The system recited in claim 60 wherein said first data communication is constrained to a single column of said matrix and said second data communication may occupy a plurality of columns.

62. The system recited in claim 60 wherein said first data communication may originate at said first location or at said intermediate location.

63. The system recited in claim 62 wherein said first data communication may be addressed to an individual one of said receiver locations or may be addressed to a group of said receiver locations.

64. The system recited in claim 60 wherein said plurality of data messages further includes additional data communications having said first bit rate, said data communications having said first bit rate being inserted into selected columns of said matrix.

65. The system recited in claim 60 wherein said first bit rate is up to 300 bits/sec. and said second bit rate is between approximately 300 and 4800 bits/sec.

66. The system recited in claim 51 wherein said means for transmitting comprises means for modulating said matrix onto an F.M. broadcast radio station subcarrier.

* * * * *

UNITED STATES PATENT AND TRADEMARK OFFICE
CERTIFICATE OF CORRECTION

PATENT NO. : 4,646,290
DATED : February 24, 1987
INVENTOR(S) : Michael T. Hills

It is certified that error appears in the above-identified patent and that said Letters Patent is hereby corrected as shown below:

| Column | Line | |
|---|---|---|
| 4 | 50 | The equation should appear as follows: (10 frames X 31 characters/frame ≠ 1200 characters/ frame) |
| 14 | 37 | Change "FIGS. 4a" to "FIGS. 4i". |

Signed and Sealed this

Twenty-fifth Day of August, 1987

*Attest:*

DONALD J. QUIGG

*Attesting Officer*  *Commissioner of Patents and Trademarks*